(12) United States Patent
Katayama

(10) Patent No.: US 6,894,958 B2
(45) Date of Patent: May 17, 2005

(54) OPTICAL SYSTEM FOR DETECTING DATA SIGNAL AND TRACKING ERROR SIGNAL

(75) Inventor: Ryuichi Katayama, Tokyo (JP)

(73) Assignee: Nec Corporation, Tokyo (JP)

( * ) Notice: Subject to any disclaimer, the term of this patent is extended or adjusted under 35 U.S.C. 154(b) by 0 days.

(21) Appl. No.: 09/442,773

(22) Filed: Nov. 18, 1999

(65) Prior Publication Data

US 2003/0058759 A1 Mar. 27, 2003

(30) Foreign Application Priority Data

Nov. 18, 1998 (JP) ............................................ 10-328656

(51) Int. Cl.$^7$ ............................................. G11B 7/095
(52) U.S. Cl. ............................... 369/44.41; 369/112.17; 369/112.15
(58) Field of Search .......... 369/112.15, 112.23–112.26, 369/112.1, 44.41, 112

(56) References Cited

U.S. PATENT DOCUMENTS

| | | | |
|---|---|---|---|
| 5,231,620 A | | 7/1993 | Ohuchida ................. 369/44.14 |
| 5,446,565 A | * | 8/1995 | Komma et al. ................ 359/19 |
| 5,519,685 A | * | 5/1996 | Kato et al. ........... 369/44.37 X |
| 5,543,228 A | * | 8/1996 | Taniguchi et al. ........... 428/429 |
| 5,627,812 A | * | 5/1997 | Yamamoto et al. .. 369/44.23 X |
| 5,648,951 A | * | 7/1997 | Kato et al. ........... 369/44.12 X |
| 5,684,762 A | * | 11/1997 | Kubo ................ 369/112.03 X |
| 5,696,750 A | * | 12/1997 | Katayama ................ 369/109 X |
| 5,737,296 A | * | 4/1998 | Komma et al. .............. 369/103 |
| 5,777,803 A | * | 7/1998 | Ju et al. ...................... 359/719 |
| 6,046,851 A | * | 4/2000 | Katayama .................... 359/486 |
| 6,084,710 A | * | 7/2000 | Katsuma ..................... 359/569 |
| 6,125,087 A | | 9/2000 | Ohnishi et al. .......... 369/44.23 |
| 6,181,668 B1 | * | 1/2001 | Kajiyama et al. ..... 369/44.12 X |
| 6,256,285 B1 | * | 7/2001 | Coombs ................. 369/112.03 |
| 6,278,548 B1 | * | 8/2001 | Shimano et al. ............ 359/565 |
| 6,337,841 B1 | * | 1/2002 | Kim et al. ............. 369/112.06 |
| 6,552,990 B1 | * | 4/2003 | Kajiyama et al. ...... 369/112.06 |

FOREIGN PATENT DOCUMENTS

| | | | | |
|---|---|---|---|---|
| JP | 60-157737 | | 8/1985 | |
| JP | 4-355221 | | 12/1992 | |
| JP | 6-236564 | | 8/1994 | |
| JP | 61-248240 | | 11/1996 | |
| JP | 9-245356 | | 9/1997 | |
| JP | 10-143878 | | 5/1998 | |
| JP | 10-143883 | | 5/1998 | |
| JP | 10-269588 | | 10/1998 | |
| JP | 11-238234 | | 8/1999 | |
| WO | WO98/19301 | * | 5/1998 | ............ G11B/7/00 |

* cited by examiner

*Primary Examiner*—Aristotelis Psitos
(74) *Attorney, Agent, or Firm*—Foley & Lardner LLP

(57) ABSTRACT

In an optical head apparatus, reflected light from the disk is diffracted by a hologram optical element, and received by an optical detector. A focusing error signal is detected from −1st-order diffracted light of the hologram optical element. A tracking error signal by the differential phase method, a tracking error signal by a push-pull method and the data signal recorded on the disk are detected from +1st-order diffracted light of the hologram optical element. A diffraction efficiency of the +1st-order diffracted light is higher than a diffraction efficiency of the −1st-order diffracted light.

2 Claims, 12 Drawing Sheets

OPTICAL SYSTEM FOR DETECTING DATA SIGNAL AND TRACKING ERROR SIGNAL

BACKGROUND OF THE INVENTION

This invention relates to an optical head apparatus for carrying out recording and reproducing for an optical recording medium, and in particular, to an optical head apparatus capable of detecting both of a tracking error signal by a differential phase method and a tracking error-signal by a push-pull method.

For an optical recording medium of a read only type, such as, DVD-ROM, a differential phase method is generally used as a method of detecting a tracking error signal.

On the other hand, for an optical recording medium of a rewritable type, such as, DVD-RAM, a push-pull method is generally used as a method of detecting a tracking error signal.

Accordingly, in order to deal with both of an optical recording medium of the read only type and an optical recording medium of the rewritable type by a single optical head apparatus, both of a tracking error signal by the differential phase method and a tracking error signal by the push-pull method are required to be detected.

Further, as a method of detecting a focusing error signal, there are generally used a Foucault method (or double knife edge method), an astigmatism method and a spot size method.

In this case, the Foucault method is featured in that noise of the focusing error signal in traversing tracks is smaller than those of the astigmatism method and the spot size method.

Japanese Unexamined Patent Publication (JP-A) No. 143878/1998 and Japanese Unexamined Patent Publication (JP-A) No. 143883/1998 disclose an optical head apparatus capable of detecting both of a tracking error signal by the differential phase method and a tracking error signal by the push-pull method, and also capable of detecting a focusing error signal by the Foucault method.

FIG. 1 shows a structure of a first conventional optical head apparatus disclosed in Japanese Unexamined Patent Publication No. 143878/1998.

Emitted light from a semiconductor laser 1 is formed into a parallel ray by a collimator lens 2, is incident on a polarization beam splitter 3 as p-polarized light, transmits therethrough substantially by 100%, is converted from linearly polarized light into circularly polarized light by a quarter-wave plate 4, and is focused onto a disk 6 by an object lens 5.

Reflected light from the disk 6 transmits through the object lens 5 in a reverse direction, is converted from circularly polarized light into linearly polarized light by the quarter-wave plate 4, is incident on the polarization beam splitter 3 as s-polarized light, reflected thereby substantially by 100%, is diffracted by a hologram optical element 158, transmits through a lens 8 and is received by an optical detector 159.

FIG. 2 is a plane view of the hologram optical element 158. The hologram optical element 158 is divided into four of a region 160 through a region 163 by two dividing lines respectively in parallel with a radial direction and a tangential direction of the disk 6.

FIG. 3 shows a pattern of the optical detector 159 and light spots on the optical detector 159.

The light detector 159 has a light receiving portion 164 through a light receiving portion 171. With this structure, +1st-order diffracted light from the region 160 of the hologram optical element 158 forms a light spot 173 on a boundary line between the light receiving portion 164 and the light receiving portion 165. −1st-order diffracted light therefrom forms a light spot 178 on the light receiving portion 170.

+1st-order diffracted light from the region 161 of the hologram optical element 158 forms a light spot 172 outside of the light receiving portions while −1st-order diffracted light therefrom forms a light spot 179 on the light receiving portion 171.

+1st-order diffracted light from the region 162 of the hologram optical element 158 forms a light spot 174 on a boundary between the light receiving portion 166 and the light receiving portion 167 while −1st-order diffracted light therefrom forms a light spot 177 on the light receiving portion 169.

+1st-order diffracted light from the region 163 of the hologram optical element 158 forms a light spot 175 outside of the light receiving portions while −1st-order diffracted light therefrom forms a light spot 176 on the light receiving portion 168.

When outputs from the light receiving portion 164 through the light receiving portion 171 are respectively designated by notations V164 through V171, the focusing error signal by the Foucault method is obtained by calculation of (V164+V167)−(V165+V166).

The tracking error signal by the differential phase method is obtained from a phase difference between V168+V170 and V169+V171.

Further, the tracking error signal by the push-pull method is obtained from calculation of (V168+V171)−(V169+V170).

Moreover, a data signal recorded on the disk 6 is obtained from calculation of V168+V169+V170+V171 or V164+V165+V166+V167+V168+V169+V170+V171.

FIG. 4 shows a structure of a module 180 which is a principal portion of the second conventional optical head disclosed in Japanese Unexamined Patent Publication No. 143883/1998.

A semiconductor laser 181 and an optical detector 182 are installed inside the module 180, and a hologram optical element 183 is arranged at a window portion of the module 180.

Emitted light from the semiconductor laser 181 partially transmits through the hologram optical element 183, and progresses toward a disk. Reflected light from the disk is partially diffracted by the hologram optical element 183, and is received by the optical detector 182.

FIG. 5 is a plane view of the hologram optical element 183. The hologram optical element 183 is divided into four of a region 184 through a region 187 by two dividing lines respectively in parallel with a radial direction and a tangential direction of the disk.

FIG. 6 shows a pattern of the optical detector 182 and light spots on the optical detector 182.

The optical detector 182 is provided with a light receiving portion 188 through a light receiving portion 193. −1st-order diffracted light from the region 184 of the hologram optical element 183 forms a light spot 195 on a boundary line between the light receiving portion 189 and the light receiving portion 190.

+1st-order diffracted light from the region 185 of the hologram optical element 183 forms a light spot 194 on the light receiving portion 188.

+1st-order diffracted light from the region 186 of the hologram optical element 183 forms a light spot 197 on the light receiving portion 193.

+1st-order diffracted light from the region 187 of the hologram optical element 183 forms a light spot 196 on a boundary line between the light receiving portion 191 and the light receiving portion 192.

When outputs from the light receiving portion 188 through the light receiving portion 193 are designated by notations V188 through V193, the focusing error signal by the Foucault method is obtained by calculation of (V189+ V192)−(V190+V191). The tracking error signal by the differential phase method is obtained by a phase difference between V189+V190+V191+V192 and V188+V193.

The tracking error signal by the push-pull method is obtained from calculation of (V189+V190+V193)−(V188+ V191+V192). Further, a data signal recorded on the disk is obtained from calculation of V188+V189+V190+V191+ V192+V193.

FIG. 7 is a sectional view of the hologram optical element 183. The hologram optical element 183 is constituted so that a dielectric film 198 is formed on a glass substrate 14.

With such a structure, emitted light from the semiconductor laser 181 is incident as incident light 199 on the hologram optical element 183, transmits therethrough as transmitted light 200, and progresses toward the disk.

Reflected light from the disk is incident as incident light 201 onto the hologram optical element 183, is diffracted as +1st-order diffracted light 202, and is received by the optical detector 182.

By forming a sectional shape of the dielectric film 198 in a sawtooth-like shape, the diffraction efficiency of the +1st-order diffracted light is enhanced, and almost no −1st-order diffracted light is generated.

In the first conventional optical head apparatus, the data signal recorded on the disk 6 is obtained by the calculation of V168+V169+V170+V171 or V164+V165+V166+V167+ V168+V169+V170+V171.

In the latter case, the light spot 173 formed on the boundary between the light receiving portion 164 and the light receiving portion 165 and the light spot 174 formed on the boundary line between the light receiving portion 166 and the light receiving portion 167, are used for detecting the data signal.

However, the frequency characteristic as an optical detector on the boundary line is lower than that on the light receiving portion. Therefore, the optical spot formed on the boundary line does not substantially contribute to detecting the data signal which is a high frequency signal.

Hence, consider only a case in that the data signal recorded on the disk 6 is obtained from calculation of V168+V169+V170+V171.

High S/N is requested to the data signal recorded in the disk 6 and the tracking error signal by the differential phase method because both of them are high frequency signals.

In order to achieve high S/N, a ratio A of an optical amount used in detecting these signals to an optical amount of the reflected light from the disk 6 is needed to be as large as possible.

A sectional shape of the hologram optical element 158 is rectangular. Therefore, the diffraction efficiency of the +1st-order diffracted light and the diffraction efficiency of the −1st-order diffracted light are equal to each other.

In this case, maximum values of the diffraction efficiencies of the ±1st-order diffracted light are about 40.5%, respectively. Namely, the maximum value of the above-mentioned A is equal to 0.405. The value is not necessarily regarded as sufficiently large.

In the second conventional optical head apparatus, the data signal recorded on the disk is obtained by the calculation of V188+V189+V190+V191+V192+V193. In this case, the optical spot 195 formed on the boundary line of the light receiving portion 189 and the light receiving portion 190 and the optical spot 196 formed on the boundary line of the light receiving portion 191 and the light receiving portion 192, are used for detecting the data signal.

However, the frequency characteristic as an optical detector on the boundary line is lower than that on the light receiving portion. Accordingly, the optical spot formed on the boundary line does not substantially contribute to detecting the data signal that is a high frequency signal.

That is, this is equivalent to detecting the data signal by only using the optical spot 194 and the optical spot 197 in correspondence with a half of the section for the reflected light from the disk. Consequently, the resolution of the data signal and crosstalk between contiguous tracks are deteriorated, and the data signal cannot be correctly detected.

Further, the focusing error signal is detected by only using the light spot 196 and the light spot 196 corresponding to a half in the section of the reflected light from the disk. In consequence, noise of the focusing error signal in traversing tracks becomes large, and the focusing error signal cannot be correctly detected.

There is conceivable a structure in which in place of the hologram optical element 158 in the first conventional optical head apparatus, the hologram optical element 183 in the second conventional optical head apparatus is used, the focusing error signal is detected from the −1st-order diffracted light and the tracking error signal by the differential phase method and the tracking error signal by the push-pull method and the data signal recorded on the disk 6 are detected from the +1st-order diffracted light.

However, in this case, the diffraction efficiency of the +1st-order diffracted light is high. Therefore, the above-mentioned value A can be increased. But, almost no −1st-order diffracted light is generated. In consequence, the focusing error signal cannot be actually detected.

SUMMARY OF THE INVENTION

It is therefore an object of the invention to provide an optical head apparatus which has a large ratio A of an optical amount used in detecting a data signal recorded on a disk and a tracking error signal by a differential phase method to an optical amount of reflected light from the disk.

It is another object of the invention to provide an optical head apparatus which is capable of realizing high S/N with respect to these signals.

According to a first aspect of the invention, there is provided an optical head apparatus including a light source, an object lens for focusing emitted light from the light source onto an optical recording medium, first optical separating means provided between the light source and the object lens for separating an optical path of reflected light from the optical recording medium, from an optical path of the emitted light from the light source, second optical separating means further separating the reflected light from the optical recording medium via the first optical separating means into a first group of light and a second group of light, and an optical detector for receiving the first group of light and the second group of light.

With this structure, an optical amount of the first group of light is larger than an optical amount of the second group of light.

When the reflected light from the disk is divided into the first group of light and the second group of light in this way, the value of the ratio A of optical amounts is large.

Further, high S/N can be achieved in respect of the data signal recorded on the disk and the tracking error signal by the differential phase method. This is because the optical amount of the first group of light is larger than the optical amount of the second group of light.

According to a second aspect of the invention, a tracking error signal by a differential phase method, a tracking error signal by a push-pull method and a data signal recorded on the optical recording medium are detected from the first group of light while a focusing error signal is detected from the second group of light.

According to a third aspect of the invention, the second optical separating means may be a hologram optical element. The first group of light is +1st-order diffracted light of the hologram optical element while the second group of light is −1st-order diffracted light of the hologram optical element.

According to a fourth aspect of the invention, the hologram optical element is divided into four regions by two divided lines respectively in parallel with a radial direction and a tangential direction of the optical recording medium. Directions of lattices or pitches of the lattices of the four regions differ from each other.

According to a fifth aspect of the invention, a phase distribution of the lattices in the hologram optical element is formed in a step-like shape of four levels.

When a phase difference of light transmitting through the two contiguous levels is designated by a notation $\phi$ and widths of the lattices at a 1-st stage through a 4-th stage are respectively designated by notations p/2-w, w, p/2-w and w, $\phi$ is substantially $\pi/2$, and w/p falls within the range of $0<w/p<0.25$ or $0.25<w/p<0.5$.

According to a sixth aspect of the invention, the first optical separating means and the second optical separating means may be an integrated polarizing hologram optical element. The polarizing hologram optical element transmits the emitted light from the light source and diffracts the reflected light from the optical recording medium.

The first group of light is +1st-order diffracted light of the polarizing hologram optical element while the second group of light is −1st-order diffracted light of the polarizing hologram optical element.

According to a seventh aspect of the invention, the polarizing hologram optical element is divided into four regions by two divided lines respectively in parallel with a radial direction and a tangential direction of the optical recording medium. Directions of lattices or pitches of the lattices of the four regions differ from each other.

According to an eighth aspect of the invention, a phase distribution of lattices in the polarizing hologram optical element is formed in a step-like shape of four levels.

When phase differences of light transmitting through the two contiguous levels in respect of ordinary light and extraordinary light are designated respectively by notations $\phi$o and $\phi$e and widths of the lattices of a 1-st stage through a 4-th stage are respectively designated by notations p/2-w, w, p/2-w and w, $\phi$o is substantially 0, $\phi$e is substantially $\pi/2$, and w/p falls in a range of $0<w/p<0.25$ or $0.25<w/p<0.5$.

The emitted light from the light source is incident on the polarizing hologram optical element as the ordinary light.

The reflected light from the optical recording medium is incident on the polarizing hologram optical element as the extraordinary light.

According to a ninth aspect of the invention, a phase distribution of lattices in the polarizing hologram optical element is formed in a step-like shape of four levels.

When phase differences of light transmitting through the two contiguous levels in respect of ordinary light and extraordinary light are designated respectively by notations $\phi$o and $\phi$e and widths of the lattices of a 1-st stage through a 4-th stage are respectively designated by notations p/2-w, w, p/2-w and w, $\phi$o is substantially $\pi/2$, $\phi$e is substantially 0, and w/p falls within the range of $0<w/p<0.25$ or $0.25<w/p<0.5$.

The emitted light from the light source is incident on the polarizing hologram optical element as the extraordinary light. The reflected light from the optical recording medium is incident on the polarizing hologram optical element as the ordinary light.

According to a tenth aspect of the invention, the second optical separating means may be a Wollaston prism. With this structure, the first group of light is one of two refracted lights of the Wollaston prism while the second group of light is the other of two refracted lights of the Wollaston prism.

According to an eleventh aspect of the invention, the Wollaston prism has a first prism disposed on an incident side of the reflected light from the optical recording medium and a second prism disposed on an emitting side of the reflected light from the optical recording medium.

In this event, an optical axis of the first prism is inclined by an angle $\theta$ to a direction in parallel with a polarizing direction of the reflected light from the optical recording medium.

An optical axis of the second prism is inclined by the angle $\theta$ to a direction orthogonal to the polarizing direction of the reflected light from the optical recording medium.

The first group of light is a refracted light constituting extraordinary light in the first prism and constituting ordinary light in the second prism in the reflected light from the optical recording medium.

The second group of light is refracted light constituting the ordinary light in the first prism and constituting the extraordinary light in the second prism in the reflected light from the optical recording medium. In this condition, $\theta$ fall within the range of $-45°<\theta<0°$ or $0°<\theta<45°$.

According to a twelfth aspect of the invention, the Wollaston prism has a first prism disposed on an incident side of the reflected light from the optical recording medium and a second prism disposed on an emitting side of the reflected light from the optical recording medium.

An optical axis of the first prism is inclined by an angle $\theta$ to a direction in parallel with a polarizing direction of the reflected light from the optical recording medium An optical axis of the second prism is inclined by the angle $\theta$ to a direction orthogonal to the polarizing direction of the reflected light from the optical recording medium.

The first group of light is refracted light constituting ordinary light in the first prism and constituting extraordinary light in the second prism in the reflected light from the optical recording medium.

The second group of light is refracted light constituting the extraordinary light in the first prism and constituting the ordinary light in the second prism in the reflected light from the optical recording medium. In this case, $\theta$ falls within the range of $-90°<\theta<-45°$ or $45°<\theta<90°$.

According to a thirteenth aspect of the invention, a four division prism for refracting the reflected light from the optical recording medium is provided between the Wollaston prism and the optical detector or between the first optical separating means and the Wollaston prism.

The four division prism is divided into four regions by two dividing lines respectively in parallel with a radial direction and a tangential direction of the optical recording medium.

Directions of inclination of emitting faces in respect of an incident face or angles made by the emitting faces and the incident face of the four regions differ from each other.

According to a fourteenth aspect of the invention, a hologram optical element for diffracting the reflected light from the optical recording medium as +1st-order diffracted light is provided between the Wollaston prism and the optical detector or between the first optical separating means and the Wollaston prism.

The hologram optical element is divided into four regions by two dividing lines respectively in parallel with a radial direction and a tangential direction of the optical recording medium. Directions of lattices, pitches of the lattices or phase distributions of the lattices differ from each other.

According to a fifteenth aspect of the invention, the phase distribution of the lattices in the hologram optical element is formed in a step-like shape of N levels (N is an integer equal to or larger than 3).

When a phase difference of light transmitting through the two contiguous levels is designated by a notation $\phi$ and all of widths of the lattices of a 1-st stage through an N-th stage are designated by a notation p/N, $\phi$ is substantially $2\pi/N$.

DESCRIPTION OF PREFERRED EMBODIMENTS

Referring to drawings, description will be hereinafter made about embodiments of this invention.

(First Embodiment)

Referring FIG. 8, description will be made about a first embodiment of this invention.

Figure 8:
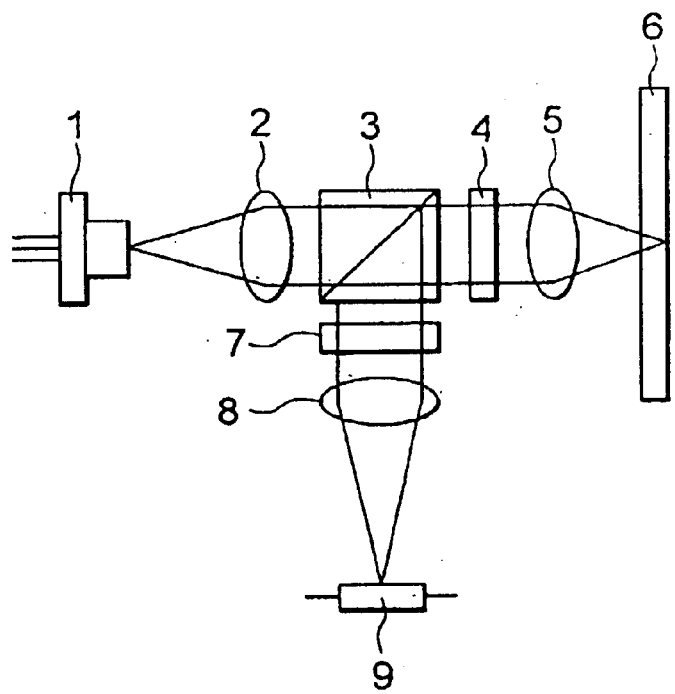
FIG. 8 is a view showing a first embodiment of an optical head apparatus according to the invention.

In FIG. 8, emitted light from the semiconductor laser 1 is formed into a parallel ray by the collimator lens 2, is incident on the polarizing beam splitter 3 as p-polarized light, transmits therethrough substantially by 100%, is converted from linearly polarized light to circularly polarized light by the quarter-wave plate 4, and is focused onto the disk 6 through the object lens 5.

Reflected light from the disk 6 transmits through the object lens 5 in a reverse direction, is converted from circularly polarized light into linearly polarized light by the quarter-wave plate 4, is incident on the polarizing beam splitter 3 as s-polarized light, is reflected substantially by 100%, is diffracted by the hologram optical element 7, transmits through the lens 8, and is received by the optical detector 9.

Figure 9:
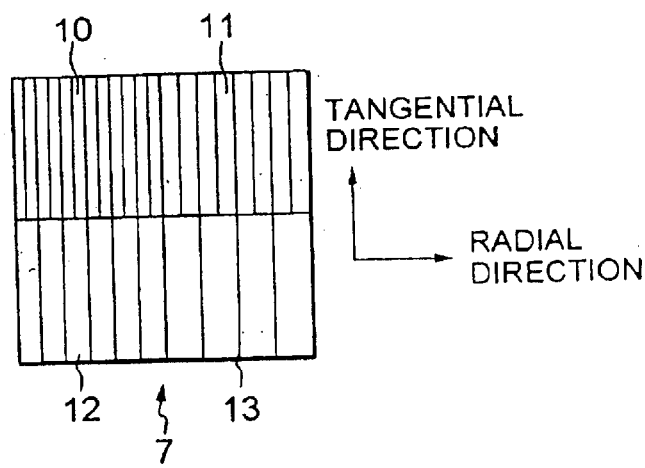
FIG. 9 is a plane view of a hologram optical element according to the first embodiment of the optical head apparatus of the invention.

In FIG. 9, the hologram optical element 7 is divided into four of a region 10 through a region 13 by two dividing lines respectively in parallel with a radial direction and a tangential direction of the disk 6. It is to be noted that a direction of a lattice is in parallel with the tangential direction of the disk 6 in any of the region 10 through the region 13. Further, pitches of the lattices become wider in the order of the region 10, the region 11, the region 12 and the region 13.

Figure 10:
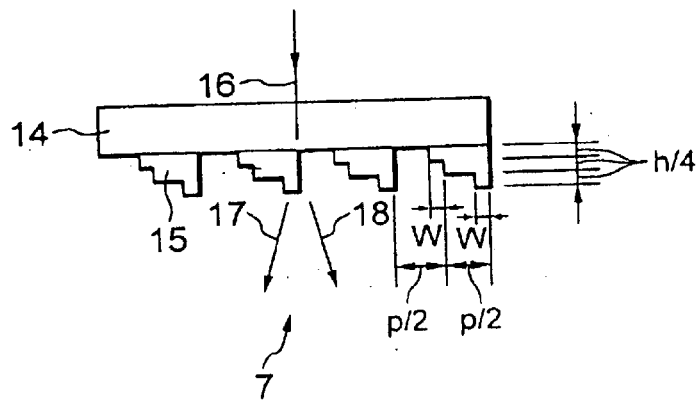
FIG. 10 is a sectional view of the hologram optical element according to the first embodiment of the optical head apparatus of the invention.

In FIG. 10, the hologram optical element 7 is constituted so that a dielectric film 15 is formed on the glass substrate 14. The reflected light from the disk 6 is incident on the hologram optical element 7 as incident light 16, is diffracted as −1st-order diffracted light 17 and +1st-order diffracted light 18, and is received by the optical detector 9.

The sectional shape of the dielectric film 15 is formed in a step-like shape of four levels. All of differences in heights of the two contiguous levels are equal to each other. When a phase difference of light transmitting through the two contiguous levels is designated by notation φ and widths of the lattices of a first stage through a fourth stage are respectively designated by notations p/2-w, w, p/2-w and w, the diffraction efficiency $\eta_{-1}$ of the −1-st-order diffracted light and the diffraction efficiency $\eta_{+1}$ of the +1st-order diffracted light are respectively given by Equation (1) and Equation (2).

$$\eta_{-1}=(2/\pi^2)(1-\cos 2\phi)\{1-\sin(2\pi w/p)\sin \phi\} \quad (1)$$

$$\eta_{+1}=(2/\pi^2)(1-\cos 2\phi)\{1+\sin(2\pi w/p)\sin \phi\} \quad (2)$$

When φ=π/2, w/p=0.135 or w/p=0.365, $\eta_{-1}$=0.10 and $\eta_{+1}$=0.71. Accordingly, when the focusing error signal is detected from the −1st-order diffracted light 17 and the tracking error signal by the differential phase method, the tracking error signal by the push-pull method and the data signal recorded on the disk 6 are detected by the +1st-order diffracted light 18, the value of the above-mentioned A becomes 0.71 which is larger than the value in the first conventional optical head apparatus. In this event, w/p satisfying $\eta_{-1}<\eta_{+1}$ and $\eta_{-1}\neq 0$ falls within the range of 0<w/p<0.25 or 0.25 <w/p<0.5.

When the difference in the heights of the two contiguous levels of the dielectric film 15 is designated by notation h/4, the refractive index of the dielectric film 15 is designated by notation n and the wavelength of the incident light 16 is designated by notation λ, φ is given by Equation (3) as follows.

$$\phi=(2\pi/\lambda)(n-1)h/4 \quad (3)$$

In the case of λ=660 nm, when $SiO_2$ is used for the dielectric film 15, since n=1.46, in order to set φ as φ=π/2, h may be as h=1.43 µm.

Figure 11:
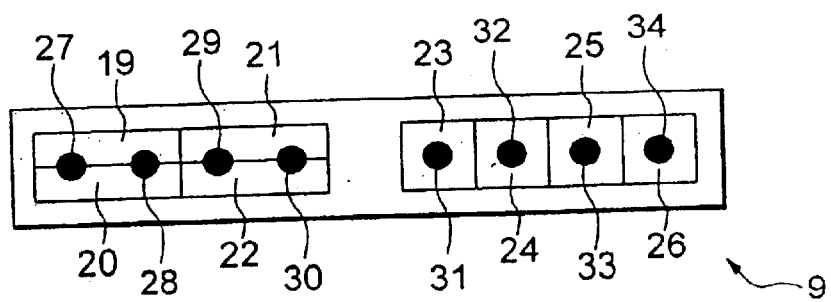
FIG. 11 is a view showing a pattern of an optical detector and light spots on the optical detector according to the first embodiment of the optical head apparatus of the invention.

In FIG. 11, the optical detector 9 has a light receiving portion 19 through a light receiving portion 26 −1st-order diffracted light from the region 10 of the hologram optical element 7 forms a light spot 27 on a boundary line between the light receiving portion 19 and the light receiving portion 20 while +1st-order diffracted light therefrom forms a light spot 34 on the light receiving portion 26.

−1st-order diffracted light from the region 11 of the hologram optical element 7 forms a light spot 28 on the boundary line between the light receiving portion 19 and the light receiving portion 20 while +1st-order diffracted light therefrom forms a light spot 33 on the light receiving portion 25.

−1st-order diffracted light from the region 12 of the hologram optical element 7 forms a light spot 29 on a boundary line between the light receiving portion 21 and the light receiving portion 22 while +1st-order diffracted light therefrom forms a light spot 32 on the light receiving portion 24.

−1st-order diffracted light from the region 13 of the hologram optical element 7 forms a light spot 30 on the boundary line between the light receiving portion 21 and the light receiving portion 22 while +1st-order diffracted light forms a light spot 31 on the light receiving portion 23.

When outputs from the light receiving portion 19 through the light receiving portion 26 are respectively designated by notations V19 through V26, the focusing error signal by the Foucault method is obtained by calculation of (V19+V22)−(V20+V21). The tracking error signal by the differential phase method is obtained from the phase difference between V23+V26 and V24+V25.

The tracking error signal by the push-pull method is obtained by calculation of (V23+V25)−(V24+V26). Further, the data signal recorded on the disk 6 is obtained by calculation of V23+V24+V25+V26.

(Second Embodiment)

Subsequently, description will be made about a second embodiment of this invention. In the second embodiment, the hologram optical element 7 and the optical detector 9 in the first embodiment illustrated in FIG. 8 are replaced by a hologram optical element 35 and an optical detector 48, respectively.

Figure 12:
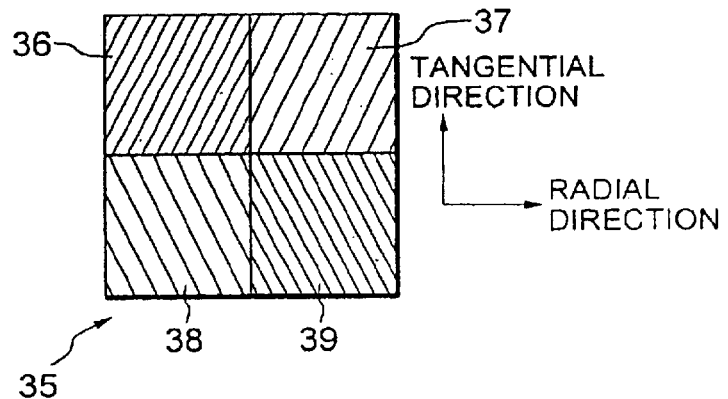
FIG. 12 is a plane view of a hologram optical element according to a second embodiment of an optical head apparatus of the invention.

In FIG. 12, the hologram optical element 35 is divided into four of a region 36 through a region 39 by two dividing lines respectively in parallel with the radial direction and the tangential direction of the disk 6. Directions of lattices are inclined by a predetermined angle in − direction relative to the tangential direction of the disk 6 in the region 36 and the region 37, and are inclined by a predetermined angle in + direction relative to the tangential direction of the disk 6 in the region 38 and the region 39.

Further, pitches of the lattices are equal respectively in the region 36 and the region 39 and in the region 37 and the region 38, and the latter is wider than the former.

Figure 13A:
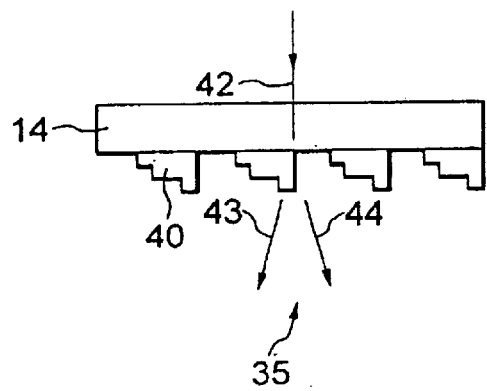
FIGS. 13A and 13B are sectional views of the hologram optical element according to the second embodiment of the optical head apparatus of the invention.

In FIG. 13A, the hologram optical element 35 is constituted so that a dielectric film 40 is formed on the glass substrate 14. Reflected light from the disk 6 is incident on the hologram optical element 35 as incident light 42, is diffracted as −1st-order diffracted light 43 and +1st-order diffracted light 44, and is received by the optical detector 48.

Figure 13B:
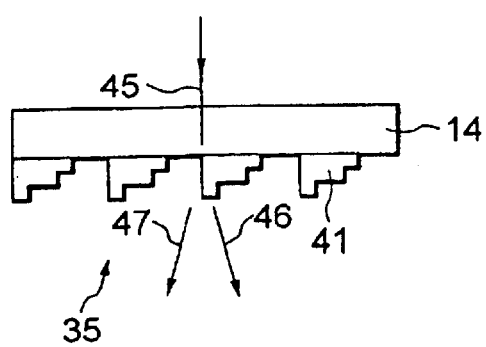

In the meanwhile, in FIG. 13B, the hologram optical element 35 is constituted so that a dielectric film 41 is formed on the glass substrate 14. Reflected light from the disk 6 is incident on the hologram optical element 35 as incident light 45, is diffracted as −1st-order diffracted light 46 and +1st-order diffracted light 47, and is received by the optical detector 48.

FIG. 13A is a sectional view of portions of the region 36 and the region 37 while FIG. 13B is a sectional view of portions of the region 38 and the region 39.

The sectional shapes of the dielectric film 40 and the dielectric film 41 are the same as the sectional shape of the dielectric film 15 in the hologram optical element 7 illustrated in FIG. 10.

Accordingly, when the focusing error signal is detected from the −1st-order diffracted light 43 and the −1st-order diffracted light 46, and the tracking error signal by the differential phase method, the tracking error signal by the push-pull method and the data signal recorded on the disk 6 are detected from the +1st-order diffracted light 44 and the +1st-order diffracted light 47, the value of the above-mentioned A becomes 0.71 that is larger than the value in the first conventional optical head apparatus.

Figure 14:
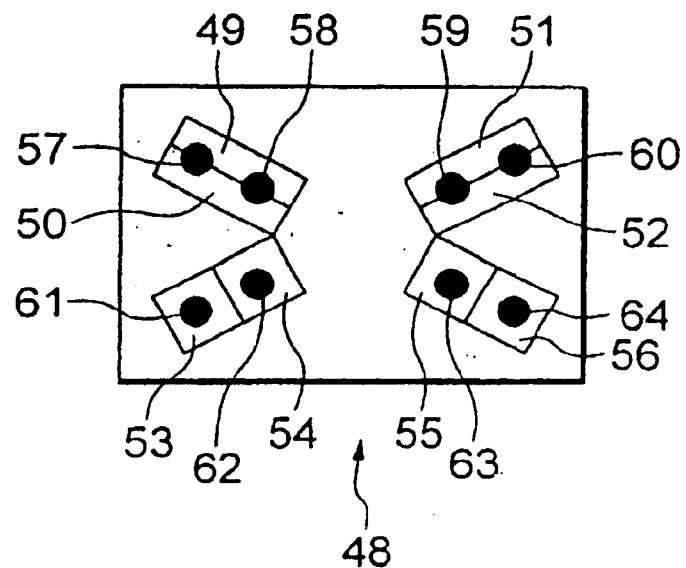
FIG. 14 is a view showing a pattern of an optical detector and light spots on the optical detector according to the second embodiment of the optical head apparatus of the invention.

In FIG. 14, the optical detector 48 has a light receiving portion 49 through a light receiving portion 56. The −1st-order diffracted light from the region 36 of the hologram optical element 35 forms a light spot 57 on a boundary line between the light receiving portion 49 and the light receiving portion 50 while the +1st-order diffracted light therefrom forms a light spot 64 on the light receiving portion 56.

The −1st-order diffracted light from the region 37 of the hologram optical element 35 forms a light spot 58 on the boundary line between the light receiving portion 49 and the light receiving portion 50 while the +1st-order diffracted light therefrom forms a light spot 63 on the light receiving portion 55.

The −1st-order diffracted light from the region 38 of the hologram optical element 35 forms a light spot 59 on a boundary line between the light receiving portion 51 and the light receiving portion 52 while the +1st-order diffracted light therefrom forms a light spot 62 on the light receiving portion 54.

The −1st-order diffracted light from the region 39 of the hologram optical element 35 forms a light spot 60 on the boundary line between the light receiving portion 51 and the light receiving portion 52 while the +1st-order diffracted light therefrom forms a light spot 61 on the light receiving portion 53.

When outputs from the light receiving portion 49 through the light receiving portion 56 are respectively designated by notations V49 through V56, the focusing error signal by the Foucault method is obtained by calculation of (V49+V52)−(V50+V51). The tracking error signal by the differential phase method is obtained by the phase difference between V53+V56 and V54+V55. The tracking error signal by the push-pull method is obtained by calculation of (V53+V55)−(V54+V56). Further, the data signal recorded on the disk 6 is obtained by calculation of V53+V54+V55+V56.

(Third Embodiment)

Subsequently, description will be made about a third embodiment of this invention with reference to FIG. 15.

Figure 15:
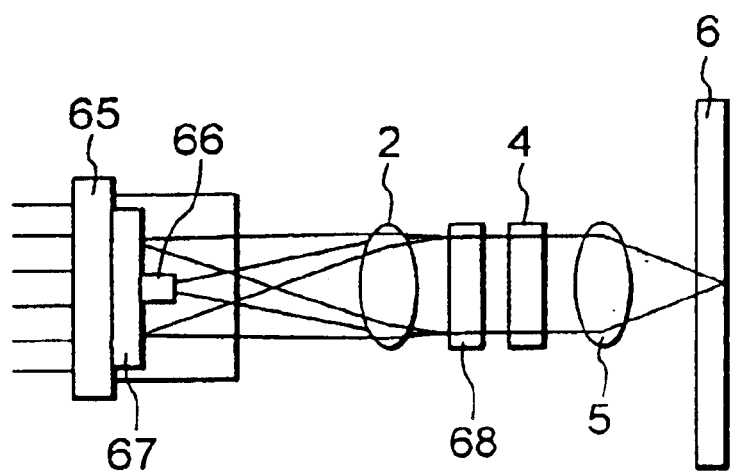
FIG. 15 is a view showing a third embodiment of any optical head apparatus according to the invention.

In FIG. 15, a semiconductor laser 66 and an optical detector 67 are installed inside a module 65. Emitted light from the semiconductor laser 66 is formed into a parallel ray by the collimator lens 2, transmits through a polarizing hologram optical element 68 substantially completely, is converted from linearly polarized light into circularly polarized light by the quarter-wave plate 4, and is focused onto the disk 6 by the object lens 5.

Reflected light from the disk 6 transmits through the object lens 5 in a reverse direction, is converted from circularly polarized light into linearly polarized light by the quarter-wave plate 4, is diffracted by the polarizing hologram optical element 68 substantially completely, transmits through the collimator lens 2, and is received by the optical detector 67.

Herein, it is to be noted that a plane view of the polarizing hologram optical element 68 is the same as the plane view of the hologram optical element 7 illustrated in FIG. 9. The polarizing hologram optical element 68 is divided into four of the region 10 through the region 13 by two dividing lines respectively in parallel with the radial direction and the tangential direction of the disk 6.

Directions of lattices are in parallel with the tangential direction of the disk 6 in any of the region 10 through the region 13. Further, pitches of the lattices become wider in the order of the region 10, the region 11 the region 12 and the region 13.

Figure 16:
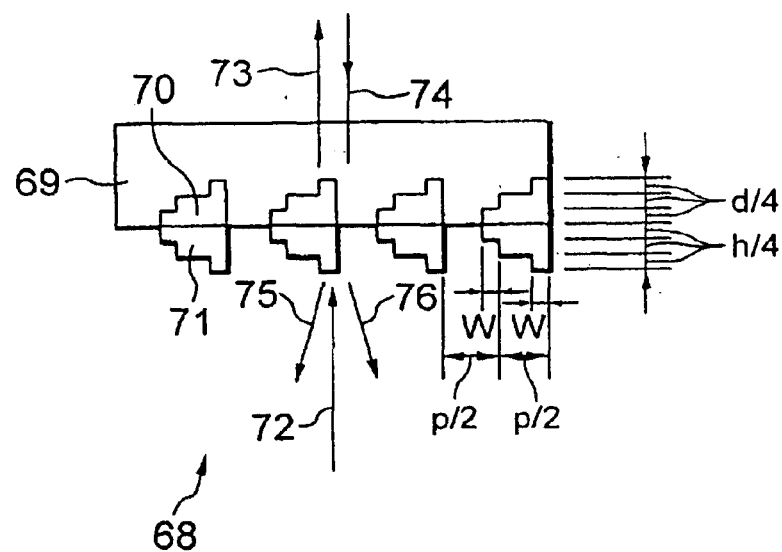
FIG. 16 is a sectional view of a polarizing hologram optical element according to the third embodiment of the optical head apparatus of the invention.

In FIG. 16, the polarizing hologram optical element 68 is constructed so that a proton exchange region 70 is formed in a substrate of a lithium niobate substrate 69 having birefringence and a dielectric film 71 is formed on the substrate, respectively.

Emitted light from the semiconductor laser 66 is incident on the polarizing hologram optical element 68 as incident light 72, transmits therethrough as transmitting light 73, and progresses toward the disk 6. Reflected light from the disk 6 is incident on the polarizing hologram optical element 68 as incident light 74, is diffracted as −1st-order diffracted light 75 and +1st-order diffracted light 76, and is received by the optical detector 67.

In the meanwhile, it is to be noted that the sectional shapes of the proton exchange region 70 and the dielectric film 71 are formed in a step-like shape of four levels. All of differences in depths of the two contiguous levels in the proton exchange region 70 are equal to each other, and all of differences in heights of the two contiguous levels in the dielectric film 71 are equal to each other.

When phase differences of light transmitting through the two contiguous levels in respect of ordinary light and extraordinary light are designated by notations $\phi o$ and $\phi e$ and widths of lattices at a first stage through a fourth stage are respectively designated by notations p/2-w, w, p/2-w and w, transmittances $\eta o_o$ and $\eta e_o$ for the ordinary and the extraordinary light, diffraction efficiencies $\eta o_{-1}$ and $\eta e_{-1}$ of the −1st-order diffracted light for the ordinary light and the extraordinary light and diffraction efficiencies $\eta o_{+1}$ and $\eta e_{+1}$ of the +1st-order diffracted light for the ordinary light and the extraordinary light are respectively given by Equation (4) through Equation (9).

$$\eta o_0 = (1/2)(1+\cos 2\phi o) \times \{1-4w/p(1-2w/p)(1-\cos \phi o)\} \quad (4)$$

$$\eta e_0 = (1/2)(1+\cos 2\phi e) \times \{1-4w/p(1-2w/p)(1-\cos \phi e)\} \quad (5)$$

$$\eta o_{-1} = (2/\pi^2)(1-\cos 2\phi o)\{1-\sin(2\pi w/p)\sin \phi o\} \quad (6)$$

$$\eta e_{-1} = (2/\pi^2)(1-\cos 2\phi e)\{1-\sin(2\pi w/p)\sin \phi e\} \quad (7)$$

$$\eta o_{+1} = (2/\pi^2)(1-\cos 2\phi o)\{1+\sin(2\pi w/p)\sin \phi o\} \quad (8)$$

$$\eta e_{+1} = (2/\pi^2)(1-\cos 2\phi e)\{1+\sin(2\lambda w/p)\sin \phi e\} \quad (9)$$

When $\phi o=0$, $\phi e=\pi/2$, w/p=0.135 or w/p=0.365, then, $\eta o_0=1$, $\eta o_{-1}=0$, $\eta o_{+1}=0$, $\eta e_o=0$, $\eta e_{-1}=0.10$ and $\eta e_{+1}=0.71$. That is, when the emitted light from the semiconductor laser 66 is incident on the polarizing hologram optical element 68 as the ordinary light, the emitted light transmits therethrough by 100% as transmitting light. When reflected light from the, disk 6 is incident on the polarizing hologram optical element 68 as the extraordinary light, the transmitted light is diffracted by 10% as the −1st-order diffracted light and by 71% as the +1st-order diffracted light.

Therefore, when the focusing error signal is detected from the −1st-order diffracted light 75, and the tracking error signal by the differential phase method, the tracking error signal by the push-pull method and the data signal recorded on the disk 5 are detected from the +1st-order diffracted light 76, then the value of the above-mentioned A becomes 0.71 which is larger than the value in the first conventional optical head apparatus. In this event, w/p satisfying $\eta e_{-1} < \eta e_{+1}$ and $\eta e_{-1} \neq 0$ falls within the range of 0<w/p<0.25 or 0.25<w/p<0.5.

When a difference in depths of the two contiguous levels of the proton exchange region 70 is designated by notation d/4, a difference in heights of the two contiguous levels of the dielectric film 71 is designated by notation h/4, changes in refractive indices for the ordinary light and the extraordinary light by proton exchange are designated by $\Delta no$ and $\Delta ne$, the refractive index of the dielectric film 71 is designated by notation n and wavelengths of the incident light 72 and the incident light 74 are designated by notation $\lambda$, $\phi o$ and $\phi e$ are given by Equation (10) and Equation (11), respectively.

$$\phi o = (2\pi/\lambda)\{\Delta nod/4 + (n-1)h/4\} \quad (10)$$

$$\phi e = (2\pi/\lambda)\{\Delta ned/4 + (n-1)h/4\} \quad (11)$$

In the case of $\lambda=660$ nm, $\Delta no=-0.04$ and $\Delta ne=0.12$ and when $Nb_2O_5$ is used for the dielectric film 71, since n=2.2, in order to set φo and φe as φo=0 and φe=π/2, d and h may be d=4.13 μm and h=138 nm.

Figure 17:
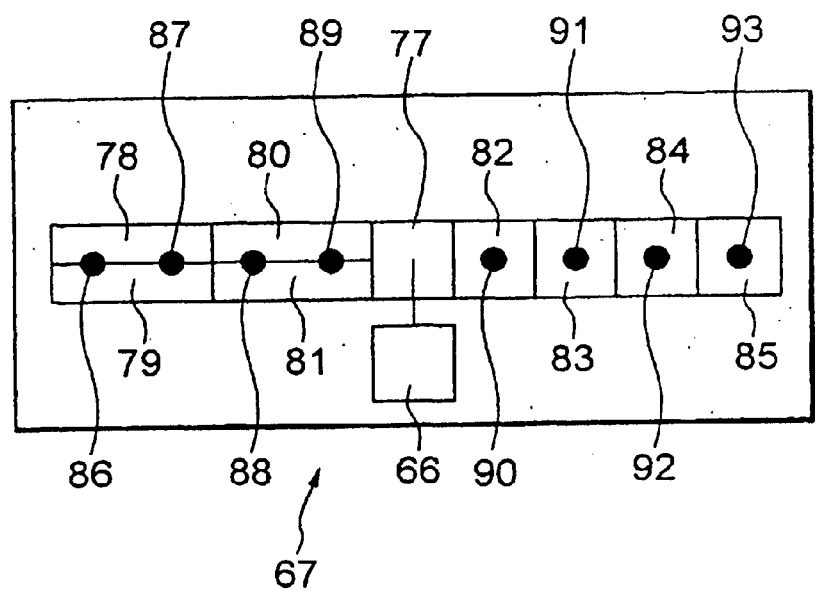
FIG. 17 is a view showing a pattern of an optical detector and light spots on the optical detector according to the third embodiment of the optical head apparatus of the invention.

In FIG. 17, the semiconductor laser 66 and a mirror 77 are arranged on the optical detector 67 The optical detector 67 has a light receiving portion 78 through a light receiving portion 85. Emitted light from the semiconductor laser 66 is reflected by the mirror 77, and progresses toward the disk 6.

The −1st-order diffracted light from the region 10 of the polarizing hologram optical element 68 forms a light spot 86 on a boundary line between the light receiving portion 78 and the light receiving portion 79 while the +1st-order diffracted light therefrom forms a light spot 93 on the light receiving portion 85.

The −1st-order diffracted light from the region 11 of the polarizing hologram optical element 68 forms a light spot 87 on the boundary between the light receiving portion 78 and the light receiving portion 79 while the +1st-order diffracted light therefrom forms a light spot 92 on the light receiving portion 84.

The −1st-order diffracted light from the region 12 of the polarizing hologram optical element 68 forms a light spot 88 on a boundary line between the light receiving portion 80 and the light receiving portion 81 while the +1st-order diffracted light therefrom forms a light spot 91 on the light receiving portion 83.

The −1st-order diffracted light from the region 13 of the polarizing hologram optical element 68 forms a light spot 89 on the boundary line between the light receiving portion 80 and the light receiving portion 81 while the +1st-order diffracted light therefrom forms a light spot 90 on the light receiving portion 82.

When outputs from the light receiving portion 78 through the light receiving portion 85 are represented respectively by notations V78 through V85, the focusing error signal by the Foucault method is obtained by calculation of (V78+V81)−(V79+V80).

The tracking error signal by the differential phase method is obtained by the phase difference between V82+V85 and V83+V84. The tracking error signal by the push-pull method is obtained by calculation of (V82+V84)−(V83+V85). Further, the data signal recorded on the disk 6 is obtained by calculation of V82+V83+V84+V85.

(Fourth Embodiment)

Subsequently, description will be made about a fourth embodiment of this invention. In the fourth embodiment, the polarizing hologram optical element 68 and the optical detector 67 in the third embodiment of the optical head apparatus illustrated in FIG. 15 are replaced by a polarizing hologram optical element 94 and an optical detector 109, respectively.

Herein, it is to be noted that the plane view of the polarizing hologram optical element 94 is the same as the plane view of the hologram optical element 35 illustrated in FIG. 12.

The polarizing hologram optical element 94 is divided into four of the region 36 through the region 39 by two dividing lines in parallel respectively with the radial direction and the tangential direction of the disk 6.

Directions of lattices are inclined by a predetermined angle in − direction relative to the tangential direction of the disk 6 in the region 36 and the region 37, and are inclined by a predetermined angle in + direction relative to the tangential direction of the disk 6 in the region 38 and the region 39.

Further, pitches of the lattices are equal to each other in the region 36 and the region 39 and in the region 37 and the region 38, and the latter is wider than the former.

Figure 18A:
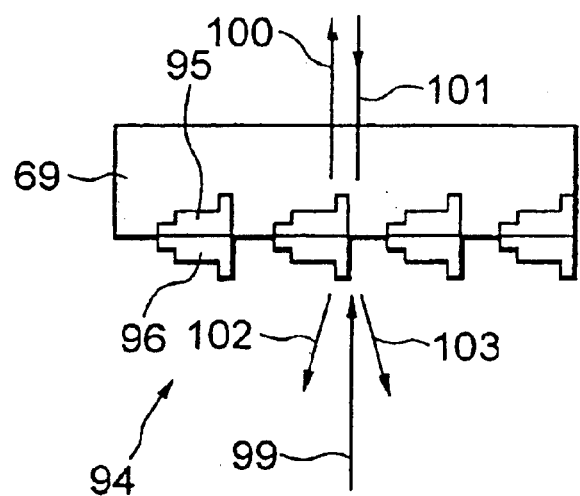
FIGS. 18A and 18B are sectional views of a polarizing hologram optical element according to a fourth embodiment of an optical head apparatus of the invention, and FIG. 18A corresponds to regions 36 and 37 while FIG. 18B corresponds to regions 38 and 39.

In FIG. 18A, the polarizing hologram optical element 94 is constituted so that a proton exchange region 95 is formed in the substrate of the lithium niobate substrate 69 having birefringence, and a dielectric film 96 is formed on the substrate, respectively. Emitted light from the semiconductor laser 66 is incident on the polarizing hologram optical element 94 as incident light 99, transmits therethrough as transmitting light 100 and progresses toward the disk 6.

Reflected light from the disk 6 is incident on the polarizing hologram optical element 94 as incident light 101, is diffracted as −1st-order diffracted light 102 and +1st-order diffracted light 103, and is received by the optical detector 109.

Figure 18B:
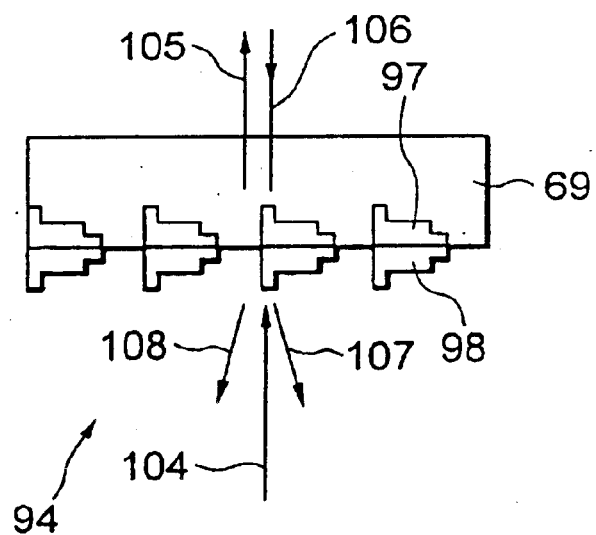

Meanwhile, in FIG. 18B, the polarizing hologram optical element 94 is constituted so that a proton exchange region 97 is formed in a substrate of the lithium niobate substrate 69 having birefringence and a dielectric film 98 is formed on the substrate, respectively. Emitted light from the semiconductor laser 56 is incident on the polarizing hologram optical element 94 as incident light 104, transmits therethrough as transmitting light 105 and progresses toward the disk 6.

Reflected light from the disk 6 is incident on the polarizing hologram optical element 94 as incident light 106, is diffracted as −1st-order diffracted light 107 and +1st-order diffracted light 108, and is received by the optical detector 109.

FIG. 18A is a sectional view of portions of the region 36 and the region 37 while FIG. 18B is a sectional view of portions of the region 38 and the region 39.

Sectional shapes of the proton exchange region 95 and the proton exchange region 97 are the same as the sectional shape of the proton exchange region 70 in the polarizing hologram optical element 68 illustrated in FIG. 16 while sectional shapes of the dielectric film 96 and the dielectric film 98 are the same as the sectional shape of the dielectric film 71 in the polarizing hologram optical element 68 illustrated in FIG. 16.

That is, when emitted light from the semiconductor laser 66 is incident on the polarizing hologram optical element 94 as ordinary light, the emitted light transmits therethrough by 100% as transmitting light. When reflected light from the disk 6 is incident on the polarizing hologram optical element 94 as extraordinary light, the reflected light is diffracted by 10% as the −1st-order diffracted light and by 71% as the +1st-order diffracted light, respectively.

Accordingly, the focusing error signal is detected from the −1st-order diffracted light 102 and −1st-order diffracted light 107, and the tracking error signal by the differential phase method, the tracking error signal by the push-pull method and the data signal recorded on the disk 6 are detected from the +1st-order diffracted light 103 and the +1st-order diffracted light 108. Under this circumstance, value of the above-mentioned A becomes 0.71 which is larger than the value in the conventional first optical head apparatus.

Figure 19:
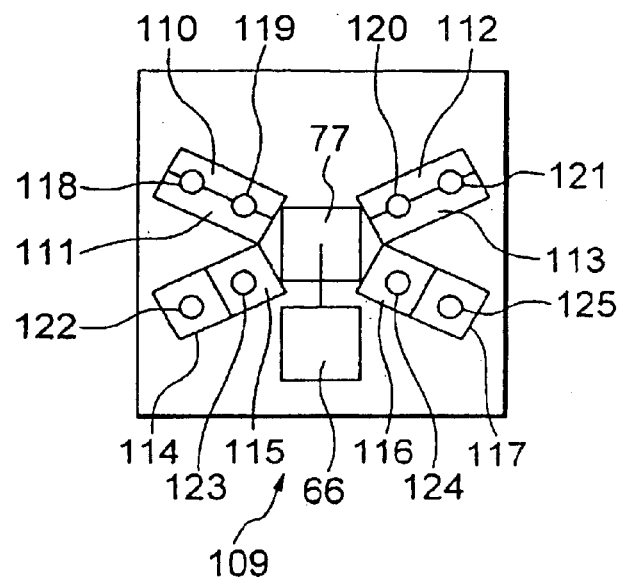
FIG. 19 is a view showing a pattern of an optical detector and light spots on the optical detector according to the fourth embodiment of the optical head apparatus of the invention.

In FIG. 19, the semiconductor laser 66 and the mirror 77 are arranged on the optical detector 109. The optical detector 109 has a light receiving portion 110 through a light receiving portion 117 Emitted light from the semiconductor laser 66 is reflected by the mirror 77, and progresses toward the disk 6.

The −1st-order diffracted light from the region 36 of the polarizing hologram optical element 94 forms a light spot 118 on a boundary between the light receiving portion 110 and the light receiving portion 111 while the +1st-order diffracted light therefrom forms a light spot 125 on the light receiving portion 117.

The −1st-order diffracted light from the region 37 of the polarizing hologram optical element 94 forms a light spot 119 on the boundary between the light receiving portion 110 and the light receiving portion 111 while the +1st-order diffracted light therefrom forms a light spot 124 on the light receiving portion 116.

The −1st-order diffracted light from the region 38 of the polarizing hologram optical element 94 forms a light spot 120 on a boundary line between the light receiving portion 112 and the light receiving portion 113 while the +1st-order diffracted light therefrom forms a light spot 123 on the light receiving portion 115.

The −1st-order diffracted light from the region 39 of the polarizing hologram optical element 94 forms a light spot 121 on the boundary line between the light receiving portion 112 and the light receiving portion 113 while the +1st-order diffracted light therefrom forms a light spot 122 on the light receiving portion 114.

When outputs from the light receiving portion 110 through the light receiving portion 117 are respectively designated by notations V110 through V117, the focusing error signal by the Foucault method is obtained by calculation of (V110+V113)−(V111+V112). The tracking error signal by the differential phase method is obtained by the phase difference between V114+V117 and V115+V116. The tracking error signal by the push-pull method is obtained by calculation of (V114+V116)−(V115+V117). Further, the data signal recorded on the disk 6 is obtained by a calculation of V114+V115+V116+V117.

In the third and the fourth embodiments, when phase differences of light transmitting through the two contiguous levels for ordinary light and extraordinary light in the polarizing hologram optical element 68 and the polarizing hologram optical element 94 are designated by notations $\phi o$ and $\phi e$, then $\phi o=0$ and $\phi e=\pi/2$.

Further, emitted light from the semiconductor laser 66 is incident on the polarizing hologram optical element 68 or the polarizing hologram optical element 94 as the ordinary light.

On the other hand, reflected light from the disk 6 is incident on the polarizing hologram optical element 68 or the polarizing hologram optical element 94 as the extraordinary light.

Alternatively, when phase differences of light transmitting through the two contiguous levels for ordinary light and extraordinary light in the polarizing hologram optical element 68 and the polarizing hologram optical element 94 are designated by notation $\phi o$ and $\phi e$, then $\phi o=\pi/2$ and $\phi e=0$. Further, the emitted light from the semiconductor laser 66 may be incident on the polarizing hologram optical element 68 or the polarizing hologram optical element 94 as the extraordinary light. The reflected light from the disk 6 may be incident on the polarizing hologram optical element 68 or the polarizing hologram optical element 94 as the ordinary light.

(Fifth Embodiment)

Subsequently, description will be made about a fifth embodiment of this invention with reference to FIG. 20.

Figure 20:
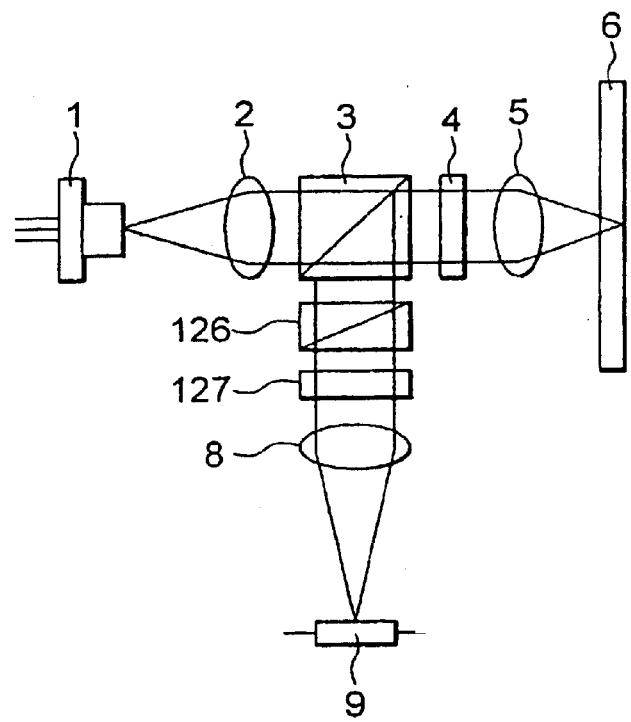
FIG. 20 is a view showing a fifth embodiment of an optical head apparatus according to the invention.

In FIG. 20, emitted light from the semiconductor laser 1 is formed into a parallel ray by the collimator lens 2, is incident on the polarization beam splitter 3 as p-polarized light, transmits therethrough substantially by 100%, is converted from linearly polarized light into circularly polarized light by the quarter-wave plate 4, and is focused onto the disk 6 by the object lens 5.

Reflected light from the disk 6 transmits through the object lens 5 in a reverse direction, is converted from circularly polarized light into linearly polarized light by the quarter-wave plate 4, is incident on the polarization beam splitter 3 as s-polarized light, reflected thereby substantially by 100%, refracted by a Wollaston prism 126 and a four division prism 127, transmits through the lens 8, and is received by the optical detector 9.

Figure 21A:
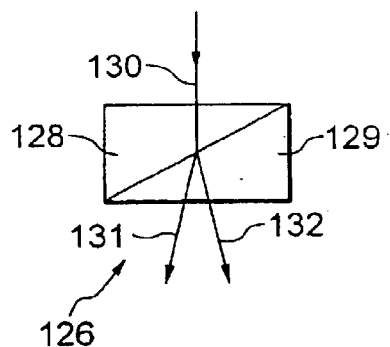
FIGS. 21A and 21B are views showing a constitution of a Wollaston prism according to the fifth embodiment of the optical head apparatus of the invention.
Figure 21B:
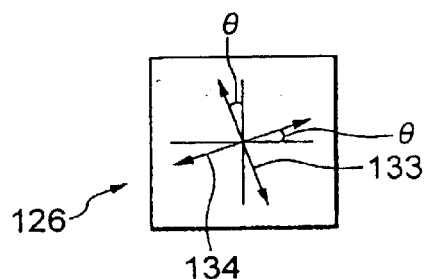

In FIGS. 21A and 21B, the structure of the Wollaston prism 126 is illustrated. Herein, it is to be noted that FIG. 21A is a side view and FIG. 21B is a plane view.

The Wollaston prism 126 is constituted by pasting together a prism 128 and a prism 129 made of lithium niobate having birefringence. Reflected light from the disk 6 is incident on the Wollaston prism 126 as incident light 130, refracted as refracted light 131 and refracted light 132, and progresses toward the four division prism 127.

The polarized light direction of the incident light 130 relative to a pasted face of the prism 128 and the prism 129 is that of s-polarized light. An optical axis 133 of the prism 128 is inclined to the s-polarized light direction by $\theta$ while an optical axis 134 of the prism 129 is inclined to a p-polarized light direction by $\theta$.

In the case of lithium niobate, the refractive index for ordinary light is larger than the refractive index for extraordinary light. As a result, a component of the incident light 130 constituting ordinary light in the prism 128 and extraordinary light in the prism 129 becomes the refracted light 131 Further, a component thereof constituting extraordinary light in the prism 128 and ordinary light in the prism 129 becomes the refracted light 132.

In this case, ratios of intensities of the refracted light 131 and the refracted light 132 to an intensity of the incident light 130 are given by $\sin^2 \theta$ and $\cos^2 \theta$. respectively. When $\theta=-22°$ or $\theta=22°$, then, $\sin^2 \theta=0.14$ and $\cos^{2\theta}=0.86$. Further, $\theta$ satisfying $\sin^2 \theta<\cos^2 \theta$ and $\sin^2 \theta \neq 0$ falls within the range of $-45°<\theta<0°$ or $0°<\theta<45°$.

Figure 1:
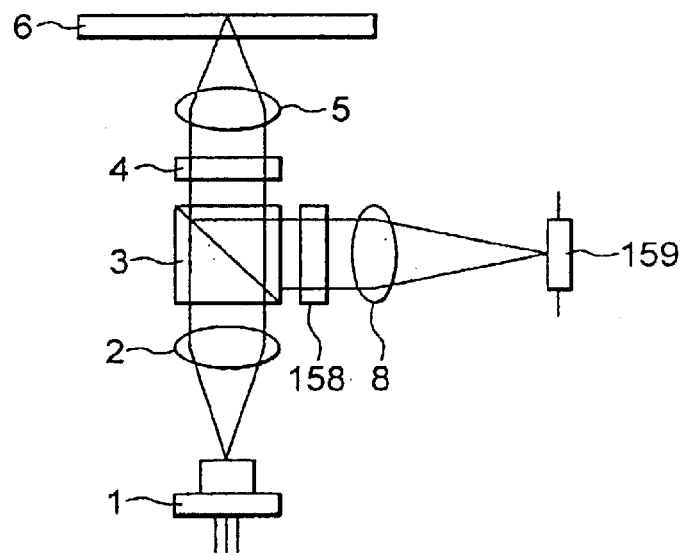
FIG. 1 is a view showing a first conventional optical head apparatus.
Figure 2:
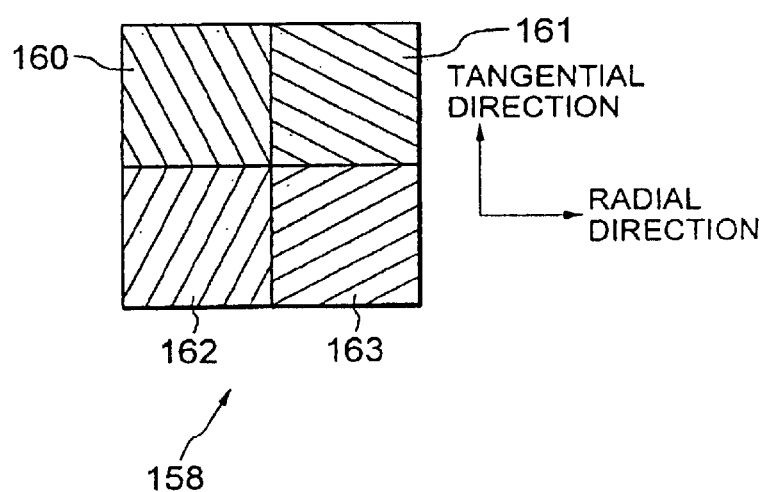
FIG. 2 is a plane view of a hologram optical element according to the first conventional optical head apparatus.
Figure 3:
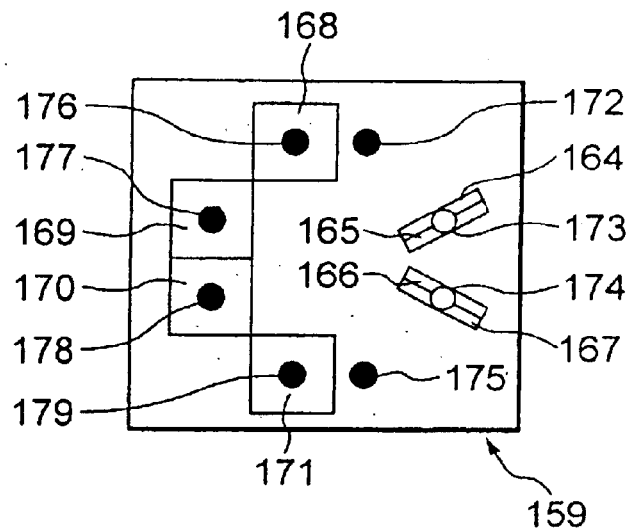
FIG. 3 is a view showing a pattern of an optical detector and light spots on the optical detector according to the first conventional optical head apparatus.
Figure 4:
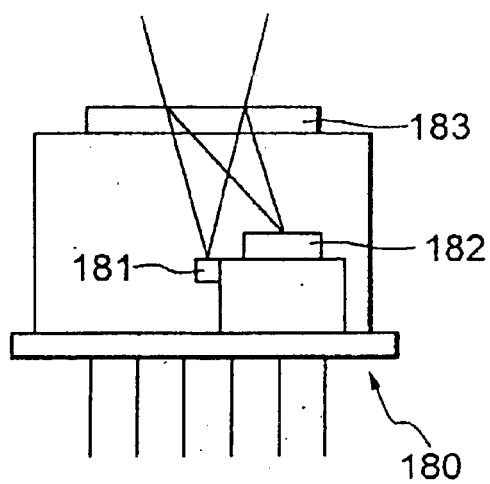
FIG. 4 is a view showing a module which is a principal portion of a second conventional optical head apparatus.
Figure 5:
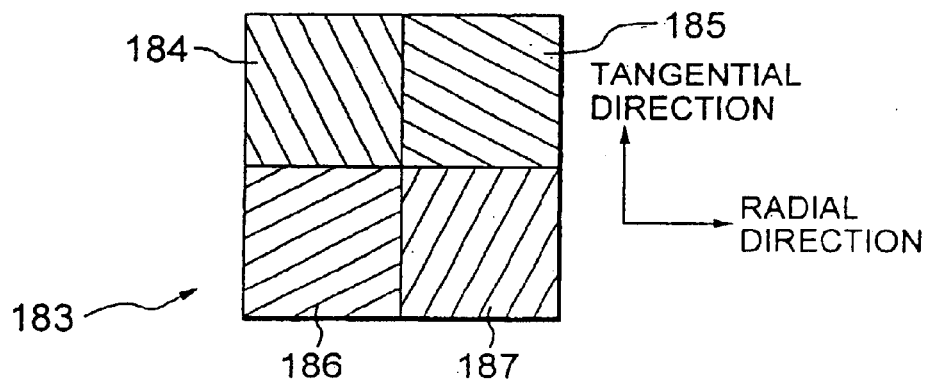
FIG. 5 is a plane view of a hologram optical element according to the second conventional optical head apparatus.
Figure 6:
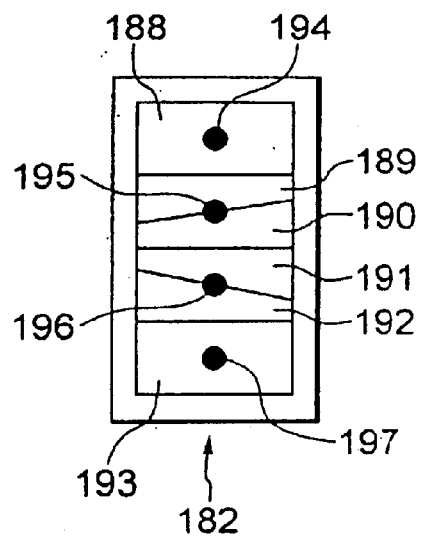
FIG. 6 is a view showing a pattern of an optical detector and light spots on the optical detector according to the second conventional optical head apparatus.
Figure 7:
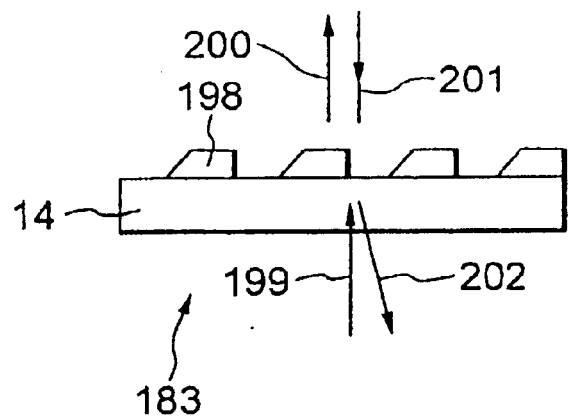
FIG. 7 is a sectional view of a hologram optical element according to the second conventional optical head apparatus.
Figure 22A:
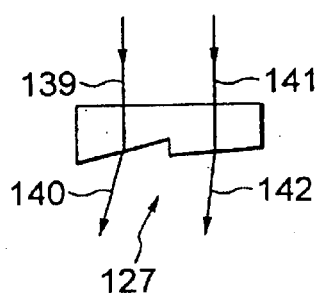
FIGS. 22A, 22B and 22C are views showing a constitution of a four division prism according to the fifth embodiment of the optical head apparatus of the invention.
Figure 22B:
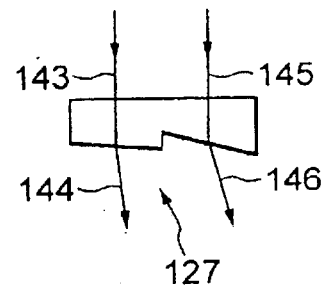
Figure 22C:
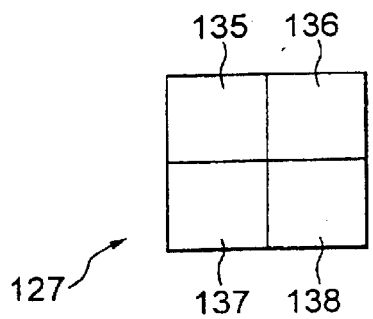

In FIGS. 22A, 22B and 22C, the constitution of the four division prism 127 is illustrated. In this event, FIG. 2A and FIG. 22B are sectional views while FIG. 22C is a plane view.

The four division prism 127 is made of plastic as its material, and is divided into four of a region 135 through a region 138 by two dividing lines respectively in parallel with the radial direction and the tangential direction of the disk 6.

FIG. 22A is a sectional view of portions of the region 135 and the region 136 while FIG. 22B is a sectional view of portions of the region 137 and the region 138.

An emitting face thereof is inclined to an incident face thereof in + direction around the tangential direction of the disk 6 in the region 135 and the region 136, and inclined in − direction around the tangential direction of the disk 6 in the region 137 and the region 138. Angles made by the emitting faces and the incident face are respectively equal in the region 135 and the region 138 and in the region 136 and the region 137, and the former is larger than the latter.

In FIG. 22A, refracted light from the Wollaston prism 126 is incident on the region 135 and the region 136 of the four division prism 127 respectively as incident light 139 and incident light 141, refracted respectively as refracted light 140 and refracted light 142, and received by the optical detector 9.

In the meanwhile, in FIG. 22B, the refracted light from the Wollaston prism 126 is incident on the region 137 and the region 138 of the four division prism 127 respectively as incident light 143 and incident light 145, refracted respectively as refracted light 144 and refracted light 146, and received by the optical detector 9.

With such a structure, the focusing error signal is detected from light refracted as the refracted light 131 by the Wollaston prism 126 and refracted by the four division prism 127 as the refracted light 140, the refracted light 142, the refracted light 144 and the refracted light 146.

Further, the tracking error signal by the differential phase method, the tracking error signal by the push-pull method and the data signal recorded on the disk 6 are detected from light refracted by the Wollaston prism 126 as the refracted light 132 and refracted by the four division prism 127 as the refracted light 140, the refracted light 142, the refracted light 144 and the refracted 146.

Under this circumstance, the value of the above-mentioned A becomes 0.86 which is larger than the value in the conventional first optical head apparatus.

A pattern of the optical detector 9 and light spots on the optical detector 9 are illustrated in FIG. 11. Among the lights refracted as the refracted light 131 by the Wollaston prism 126, light refracted as the refracted light 140 at the region 135 of the four division prism 127 forms the light spot 27 on the boundary line between the light receiving portion 19 and the light receiving portion 20.

Further, light refracted as the refracted light 142 by the region 136 of the four division prism 127 forms the optical spot 28 on the boundary line between the light receiving portion 19 and the light receiving portion 20.

Moreover, light refracted as the refracted light 144 by the region 137 of the four division prism 127 forms the light spot 29 on the boundary line between the light receiving portion 21 and the light receiving portion 22.

In addition, light refracted as the refracted light 146 by the region 138 of the four division prism 127 forms the light spot 30 on the boundary line between the light receiving portion 21 and the light receiving portion 22.

Among the lights refracted as the refracted light 132 by the Wollaston prism 126, light refracted as the refracted light 140 by the region 135 of the four division prism 127 forms the light spot 31 on the light receiving portion 23.

Further, light refracted as the refracted light 142 by the region 135 of the four division prism 127 forms the light spot 32 on the light receiving portion 24.

Moreover, light refracted as the refracted light 144 by the region 137 of the four division prism 127 forms the light spot 33 on the light receiving portion 25.

In addition, light refracted as the refracted light 145 by the region 138 of the four division prism 127 forms the light spot 34 on the light receiving portion 26.

The focusing error signal by the Foucault method, the tracking error signal by the differential phase method, the tracking error signal by the push-pull method and the data signal recorded on the disk 6 are obtained by the same calculation as that in the first embodiment.

In the fifth embodiment, the four division prism 127 is arranged between the Wollaston prism 126 and the lens 8. Alternatively, the four division prism 127 may be arranged between the polarization beam splitter 3 and the Wollaston prism 126.

(Sixth Embodiment)

Subsequently, description will be made about a sixth embodiment of this invention. In the sixth embodiment, the four division prism 127 in the fifth embodiment illustrated in FIG. 20 is replaced by a hologram optical element 147.

Figure 23:
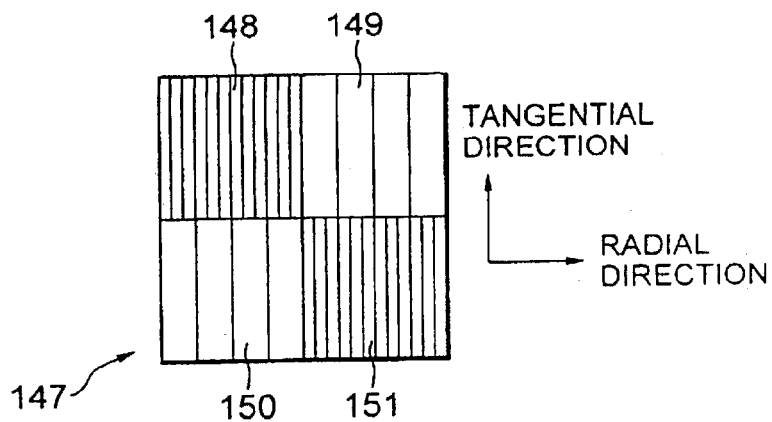
FIG. 23 is a plane view of a hologram optical element according to a sixth embodiment of an optical head apparatus of the invention.

With this structure, reflected light from the disk 6 is refracted by the Wollaston prism 126, is diffracted by the hologram optical element 147, and is received by the optical detector 9. In FIG. 23, the hologram optical element 147 is divided into four of a region 148 through a region 151 by two dividing lines respectively in parallel with the radial direction and the tangential direction of the disk 6.

Directions of lattices are in parallel with the tangential dire on of the disk 6 in any of the region 148 through the region 151. Further, pitches of the lattices are equal respectively in the region 148 and the region 151 and in the region 149 and the region 150, and the latter is wider than the former.

Figure 24A:
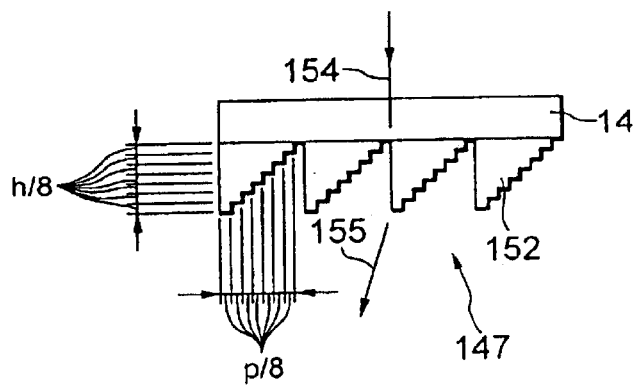
FIGS. 24A and 24B are sectional views of the hologram optical element according to the sixth embodiment of the optical head apparatus of the invention.
Figure 24B:
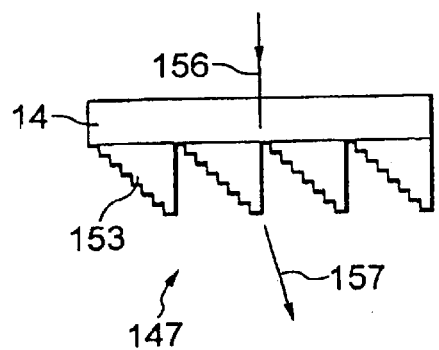

FIG. 24A is a sectional view of portions of the region 148 and the region 149 while FIG. 24B is a sectional view of portions of the region 150 and the region 151.

In FIG. 24A, the hologram optical element 147 is constructed so that a dielectric film 152 is formed on the glass substrate 14. With this structure, refracted light from the Wollaston prism 126 is incident on the hologram optical element 147 as incident light 154, diffracted as +1st-order diffracted light 155 and is received by the optical detector 9.

Meanwhile, in FIG. 24B, the hologram optical element 147 is constructed so that a dielectric film 153 is formed on the glass substrate 14. With such a structure, refracted light from the Wollaston prism 126 is incident on the hologram optical element 147 as incident light 156, diffracted as +1st-order diffracted light 157 and is received by the optical detector 9.

Herein, it is to be noted that sectional shapes of the dielectric film 152 and the dielectric film 153 are formed in a step-like shape of 8 levels. All of differences in heights of the two contiguous levels are equal to each other.

When a phase difference of light transmitting through the two contiguous levels is designated by notation $\phi$, and all of widths of the lattices in a first stage through an eighth stage are designated by notation p/8, the diffraction efficiency $\eta_{+1}$ of the +1st-order diffracted light is given by Equation (12).

$$\eta_{+1}=(4/\pi^2)(1-1/\sqrt{2})\{1+\cos(\phi-\pi/4)\}\{1+\cos(2\phi-\pi/2)\}\{1+\cos(4\phi-\pi)\} \quad (12)$$

When $\phi$ is set as $\phi=\pi/4$, then, $\eta_{+1}=0.95$.

Under this circumstance, the focusing error signal is detected from light refracted as the refracted light 131 by the Wollaston prism 126 and diffracted as the +1st-order diffracted light 155 and the +1st-order diffracted light 157 by the hologram optical element 147.

Further, the tracking error signal by the differential phase method, the tracking error signal by the push-pull method and the data signal recorded on the disk 6 are detected from light refracted as the refracted light 132 by the Wollaston prism 126 and diffracted as the +1st-order diffracted light 155 and the +1st-order diffracted light 157 by the hologram optical element 147.

In this condition, the value of the above-mentioned A becomes 0.86×0.95=0.82 which is larger than the value in the conventional first optical head apparatus.

When differences in heights of the two contiguous levels of the dielectric film 152 and the dielectric film 153 are designated by notation h/8, the refractive indices of the dielectric film 162 and the dielectric film 153 are designated by notation n, and wavelengths of the incident light 154 and the incident light 156 are designated by notation $\lambda$, $\phi$ is given by Equation (13).

$$\phi=(2\pi/\lambda)(n-1)h/8 \quad (13)$$

In the case of $\lambda=660$ nm, when $SiO_2$ is used for the dielectric film 152 and the dielectric film 153, since n=1.46, in order to set $\phi=\pi/4$, h may be h=1.43 μm.

A pattern of the optical detector 9 and light spots on the optical detector 9 are shown by FIG. 11. Among the lights refracted as the refracted light 131 by the Wollaston prism 126, light diffracted as the +1st-order diffracted light 155 by the region 148 of the hologram optical element 147 forms the light spot 27 on the boundary line between the light receiving portion 19 and the light receiving portion 20.

Further, light diffracted as +1st-order diffracted light 155 by the region 149 of the hologram optical element 147 forms the light spot 28 on the boundary line between the light receiving portion 19 and the light receiving portion 20.

Moreover, light diffracted as the +1st-order diffracted light 157 by the region 150 of the hologram optical element 147 forms the light spot 29 on the boundary line between the light receiving portion 21 and the light receiving portion 22.

In addition, light diffracted as the +1st-order diffracted light 157 by the region 151 of the hologram optical element 147 forms the light spot 30 on the boundary line between the light receiving portion 21 and the light receiving portion 22.

Among the lights refracted as the refracted light 132 by the Wollaston prism 126, light diffracted as the +1st-order diffracted light 155 by the region 148 of the hologram optical element 147 forms the light spot 31 on the light receiving portion 23.

Further, light diffracted as the +1st-order diffracted light 155 by the region 149 of the hologram optical element 147 forms the light spot 32 on the light receiving portion 24.

Moreover, light diffracted as the +1st-order diffracted light 157 by the region 150 of the hologram optical element 147 forms the light spot 33 on the light receiving portion 25.

In addition, light diffracted as the +1st-order diffracted light 157 by the region 151 of the hologram optical element 147 forms the light spot 34 on the light receiving portion 26.

The focusing error signal by the Foucault method, the tracking error signal by the differential phase method, the tracking error signal by the push-pull method and the data signal recorded on the disk 6 are obtained by the same calculation as that in the first embodiment.

In the sixth embodiment, the hologram optical element 147 is arranged between the Wollaston prism 126 and the lens 8. Alternatively, the hologram optical element 147 may be arranged between the polarization beam splitter 3 and the Wollaston prism 126.

Further, in the sixth embodiment, a phase distribution of lattice in the hologram optical element 147 is formed in a step-like shape of 8 levels and when the phase difference of light transmitting through the two contiguous levels is designated by notation $\phi$, all of widths of lattices of a first stage through an eighth stage are designated by p/8, $\phi=\pi/4$.

Alternatively, when a phase distribution of lattice in the hologram optical element 147 is formed in a step-like shape of N levels (N is an integer equal to or larger than 3), the phase difference of light transmitting through the contiguous levels may be generally designated by notation $\phi$ and all of widths of lattices of a first stage through an N-th stage are designated by notation p/N, then $\phi=2\pi/N$.

In the fifth and the sixth embodiments, the optical axis 133 of the prism 128 is inclined to the s-polarized light direction by $\theta$. The optical axis 134 of the prism 129 is inclined to the p-polarized light direction by $\theta$. The focusing error signal is detected from the refracted light 131 which is a component of the incident light 130 constituting ordinary light in the prism 128 and extraordinary light in the prism 129.

Further, the tracking error signal by the differential phase method, the tracking error signal by the push-pull method and the data signal recorded on the disk 6 are detected from the refracted light 132 which is a component thereof constituting the extraordinary light in the prism 128 and ordinary light in the prism 129, and $\theta$ falls within the range of $-45°<\theta<0°$ or $0°<\theta<45°$.

In this case, the ratios of the intensities of the refracted light 131 and the refracted light 132 to the intensity of the incident light 130 are given respectively by $\sin^2\theta$ and $\cos^2\theta$, and $\sin^2\theta<\cos^2\theta$ and $\sin^2\theta\neq 0$.

In contrast, the optical axis 133 of the prism 128 is inclined to the s-polarized light direction by $\theta$. The optical axis 134 of the prism 129 is inclined to the p-polarized light direction by $\theta$. The focusing error signal is detected from the refracted light 132 which is a component of the incident light 130 constituting extraordinary light in the prism 128 and ordinary light in the prism 129.

Further, the tracking error signal by the differential phase method, the tracking error signal by the push-pull method and the data signal recorded on the disk 6 are detected from the refracted light 131 which is a component thereof constituting the ordinary light in the prism 128 and the extraordinary light in the prism 129, and $\theta$ falls within the range of $-90°<\theta<-45°$ or $45°<\theta<90°$.

In this case, the ratios of the intensities of the refracted light 131 and the refracted light 132 to the intensity of the incident light 130 are respectively given by $\sin^2\theta$ and $\cos^2\theta$ and $\sin^2\theta>\cos^2 74$ and $\sin^2\theta\neq 0$.

According to the above-mentioned optical head apparatus, reflected light from the disk is divided into the first group of light and the second group of light. The tracking error signal by the differential phase method, the tracking error signal by the push-pull method and the data signal recorded on the disk are detected from the first group of light while the focusing error signal is detected from the second group of light.

In this event, an optical amount of the first group of the light is larger than an optical amount of the second group of the light.

With this structure, the ratio A of the optical amount used in detecting the data signal recorded on the disk and the tracking error signal by the differential phase method to the optical amount of the reflected light from the disk is large, and high S/N is achieved with respect to these signals. This is because the optical amount of the first group of light is larger.

What is claimed is:

1. An optical system comprising:

a light source;

an object lens for focusing emitted light from the light source onto an optical recording medium;

first optical separating means which is provided between the light source and the object lens and which separates an optical path of reflected light from the optical recording medium, from an optical path of the emitted light from the light source;

second optical separating means which separates the reflected light from the optical recording medium via the first optical separating means into a first group of light and a second group of light; and an optical detector for receiving the first group of light and the second group of light;

wherein an optical signal strength of the first group of light is larger than an optical signal strength of the second group of light, and wherein the system is constituted such that a tracking error signal by a differential phase method, a tracking error signal by a push-pull method and a data signal recorded on the optical recording medium are detected from the first group of light while a focusing error signal is detected from the second group of light, and wherein the second optical separating means comprises a step-shaped holographic optical element that includes a plurality of four-step units, each of the plurality of four-step units including a first step having a first length, a second step having a second length shorter or longer than the first length, a third step having the first length, and a fourth step having the second length.

2. An optical system as claimed in claim 1, wherein the holographic optical element is divided into four regions by two divided lines respectively in parallel with a radial direction and a tangential direction of the optical recording medium, and wherein directions of lattices or pitches of the lattices of the four regions are different from each other.

* * * * *

UNITED STATES PATENT AND TRADEMARK OFFICE
CERTIFICATE OF CORRECTION

PATENT NO. : 6,894,958 B2
DATED : May 17, 2005
INVENTOR(S) : Ryuichi Katayama

It is certified that error appears in the above-identified patent and that said Letters Patent is hereby corrected as shown below:

<u>Title page,</u>
Item [73], Assignee, "Nec Corporation" should read -- NEC Corporation --.

Signed and Sealed this

Nineteenth Day of July, 2005

JON W. DUDAS
*Director of the United States Patent and Trademark Office*